(12) United States Patent
Chen et al.

(10) Patent No.: US 10,373,121 B2
(45) Date of Patent: Aug. 6, 2019

(54) INTEGRATING A CALENDARING SYSTEM WITH A MASHUP PAGE CONTAINING WIDGETS TO PROVIDE INFORMATION REGARDING THE CALENDARED EVENT

(75) Inventors: Feng-Wei Chen, Cary, NC (US); John R. Hind, Raleigh, NC (US); Joseph D. Johnson, Raleigh, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 13/231,051

(22) Filed: Sep. 13, 2011

(65) Prior Publication Data

US 2013/0067302 A1 Mar. 14, 2013

(51) Int. Cl.
*G06Q 10/10* (2012.01)
*G06F 16/958* (2019.01)
*G06F 3/0481* (2013.01)

(52) U.S. Cl.
CPC ....... *G06Q 10/1093* (2013.01); *G06F 16/958* (2019.01); *G06F 3/04817* (2013.01)

(58) Field of Classification Search
CPC .......... G06F 3/04817; G06F 8/10; G06F 8/38; G06F 17/30241; G06F 17/30572; G06F 17/3087; G06F 17/30887; G06F 2203/04806; G06F 8/34; G06F 9/4443; G06F 17/30539; G06F 17/30545; G06F 17/30557
USPC .................................................. 715/202, 230
See application file for complete search history.

(56) References Cited

U.S. PATENT DOCUMENTS

| | | | |
|---|---|---|---|
| 6,018,343 A | 1/2000 | Wang et al. | |
| 7,426,543 B2 | 9/2008 | Pfitzner | |
| 7,577,771 B2 | 8/2009 | Steeb et al. | |
| 7,882,092 B2 | 2/2011 | Dasgupta et al. | |
| 8,910,067 B1 * | 12/2014 | Anderson | 715/765 |
| 2006/0004923 A1 | 1/2006 | Cohen et al. | |
| 2007/0043687 A1 * | 2/2007 | Bodart | G06Q 10/107 |

(Continued)

OTHER PUBLICATIONS

IBM, "Disconnected Access to Calendaring Data," IP.com No. IPCOM000168782D, Mar. 24, 2008, p. 1.

(Continued)

*Primary Examiner* — Scott T Baderman
*Assistant Examiner* — Benjamin Smith
(74) *Attorney, Agent, or Firm* — Robert A. Voigt, Jr.; Winstead, P.C.

(57) ABSTRACT

A method, system and computer program product for integrating a calendaring system with a mashup page. A mashup server accesses the calendar data inputted by a user to create or edit an entry in a calendar application. The mashup server provides the user access to widgets to be included on a mashup page, where the widgets use the accessed calendar information so that the widgets provide information to the recipients of the calendared event. In this manner, the widgets provide information that normally would be accessible by the participants via links to a myriad of disjoint applications thereby negating the fractured experience of the participants. Upon finalizing the mashup page, the mashup page is saved as a Uniform Resource Location (URL) in the created/edited calendar entry. The mashup page is later transmitted by the mashup server to the recipients of the calendar entry.

22 Claims, 6 Drawing Sheets

(56) References Cited

U.S. PATENT DOCUMENTS

| | | | |
|---|---|---|---|
| 2007/0101291 A1* | 5/2007 | Forstall et al. | 715/805 |
| 2007/0130541 A1* | 6/2007 | Louch et al. | 715/804 |
| 2007/0203735 A1* | 8/2007 | Ashton | G06Q 10/02 705/5 |
| 2007/0266093 A1* | 11/2007 | Forstall et al. | 709/204 |
| 2008/0091500 A1 | 4/2008 | Barber-Mingo et al. | |
| 2008/0104611 A1* | 5/2008 | Kussmaul | 719/311 |
| 2008/0115196 A1* | 5/2008 | Michel et al. | 726/4 |
| 2008/0249969 A1* | 10/2008 | Tsui | H02J 7/0055 706/46 |
| 2009/0037832 A1* | 2/2009 | Falchuk et al. | 715/764 |
| 2009/0064247 A1* | 3/2009 | Biniak et al. | 725/105 |
| 2009/0210807 A1* | 8/2009 | Xiao et al. | 715/760 |
| 2009/0247134 A1* | 10/2009 | Jeide et al. | 455/414.2 |
| 2009/0313601 A1* | 12/2009 | Baird et al. | 717/106 |
| 2010/0324968 A1* | 12/2010 | Schoettle | 705/10 |
| 2010/0325004 A1* | 12/2010 | Schoettle | 705/26 |
| 2011/0283320 A1* | 11/2011 | Levin et al. | 725/40 |
| 2012/0016678 A1* | 1/2012 | Gruber | G06F 17/3087 704/275 |
| 2012/0102408 A1* | 4/2012 | Zhao | G06Q 10/109 715/738 |

OTHER PUBLICATIONS

Daboo et al., "Calendaring Extensions to WebDAV (CalDAV) (RFC4791)," IP.com No. IPCOM000147450D, Mar. 1, 2007, Section 8.2, Synchronization Operations, pp. 69-72.

Ionescu et al., "Dynamic Content and Offline Collaboration in Synchronous Groupware," 2002 Western MultiConference, Jan. 27-31, 2002, pp. 1-6.

\* cited by examiner

INTEGRATING A CALENDARING SYSTEM WITH A MASHUP PAGE CONTAINING WIDGETS TO PROVIDE INFORMATION REGARDING THE CALENDARED EVENT

TECHNICAL FIELD

The present invention relates to calendaring systems, and more particularly to integrating a calendaring system with a mashup page containing widgets to provide information regarding the calendared event, both before, during and after the calendared event.

BACKGROUND

Calendaring systems, in the simplest form, help users to organize their time. Additionally, calendaring systems may be used to schedule meetings, appointments, or other types of calendar events. Currently available calendaring systems allow a user to send electronic mail (e-mail) messages to recipients, where the e-mail messages pertain to a calendar event. When a user composes an e-mail message, the user specifies one or more recipients. Recipients may be individuals or groups.

Often the location and/or description of the calendar entry are extended with various links to collaborative systems which provide a resource to the meeting participants before, during or after the calendared event. For example, a wiki (allows the creating and editing of any number of interlinked web pages via a web browser) may be used to collect questions before the meeting. In another example, a file folder may be used to hold presentation materials. Also, a web conference link may be included for use during the event. In another example, a link might be provided to play back the recorded meeting after the completion of the meeting.

Since these external resources may be provided by various external applications, the participants of the calendared event may have to link to a myriad of disjoint applications to explore the meeting resources thereby causing the participants to have a fractured experience. Additionally, in many cases, these resources may be changed between the time of the original invitation and the event thereby leaving uniformed participants in limbo. Also, some of these resources may be not be appropriate for some of the participants of the event to see.

BRIEF SUMMARY

In one embodiment of the present invention, a method for integrating a calendaring system with a mashup page comprises accessing calendar data used in creating or editing an entry in a calendar. The method further comprises creating the mashup page. In addition, the method comprises providing one or more widgets on the mashup page, where the one or more widgets use the accessed calendar data. Additionally, the method comprises saving the mashup page associated with the calendar entry. Furthermore, the method comprises transmitting, by a processor of a mashup server, the mashup page associated with the calendar entry to one or more recipients of the calendar entry.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for integrating a calendaring system with a mashup page. In one embodiment of the present invention, a mashup server accesses the calendar data inputted by a user to create or edit an entry in a calendar application. The mashup server provides the user access to widgets to be included on a mashup page, where the widgets use the accessed calendar information so that the widgets provide information to the recipients of the calendared event, such as information about the meeting, about their fellow invitees, about past meetings, etc. In this manner, the widgets provide information that normally would be accessible by the participants via links to a myriad of disjoint applications thereby negating the fractured experience of the participants. Additionally, the user can edit the control settings for the widgets so that the widgets on the mashup page can be tailored to be rendered for selected participants thereby ensuring that only particular participants have access to the information desired by the user. Upon finalizing the mashup page, the mashup page is saved as a Uniform Resource Location (URL) in the created/edited calendar entry. The mashup page is later transmitted by the mashup server to the recipients of the calendar entry.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
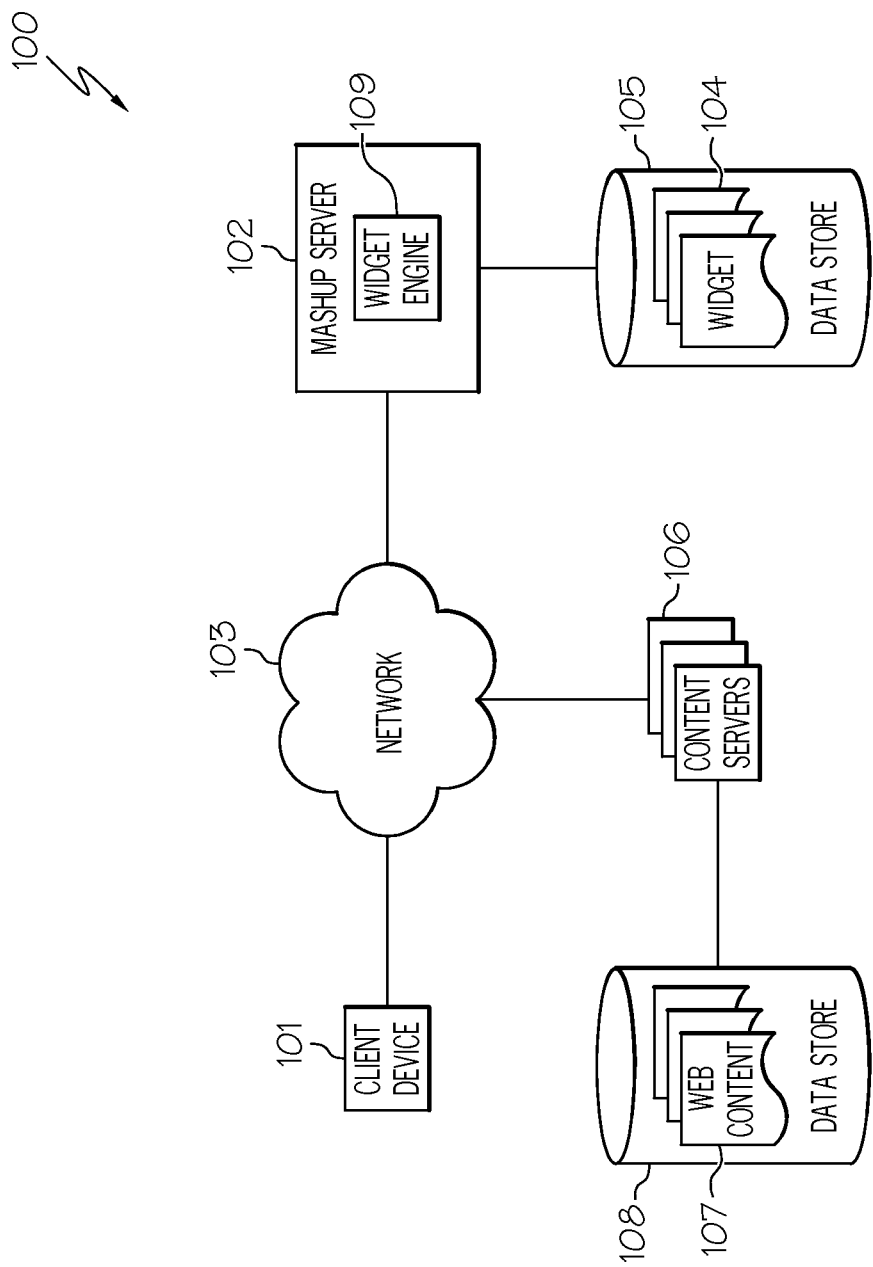
FIG. 1 illustrates a network system configured in accordance with an embodiment of the present invention.

Referring now to the Figures in detail, FIG. 1 illustrates a network system 100 for generating mashup pages that are integrated with a calendaring system, where the mashup pages include widgets used to provide information regarding the calendared event, both before, during and after the calendared event. Referring to FIG. 1, system 100 includes a client device 101 having a browser (not shown) to interact with a mashup server 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with mashup server 102. A description of the hardware configuration of client device 101 is provided below in connection with FIG. 2. While FIG. 1 illustrates a single client device 101, system 100 may include a plurality of client devices 101, where multiple client devices 101 may be invitees to a calendared event created by one of client devices 101.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Mashup server 102 is configured to provide a mashup application to client device 101 in response to user initiated requests. A description of the hardware configuration of mashup server 102 is provided below in connection with FIG. 3. A mashup application, also referred to as a "mashup web page" or "mashup page," uses content from more than one source to create a completely new service. That is, a mashup is a software component that yields new utility by seamlessly combining content from two or more sources or disparate components with new behavior to form a new, integrated web application. Content used in mashups can come from a third party via a public interface (API), an RSS or ATOM feed, screen scraping, and the like. Mashups use a set of source specific mashup widgets, one for each data source.

As illustrated in FIG. 1, a mashup page can utilize a plurality of different widgets 104 stored in a data store 105, each associated with a specific content source 106, which interact with each other using eventing mechanisms (facilitate interactions with other mashup elements, which include other widgets 104). Each widget 104 can pull web content 107 from a data store 108, which is accessible by the widget engine 109. Mashup widget 104 can be a portable chunk of code that can be installed and executed within any separate Hypertext Markup Language (HTML)-based web page without requiring additional compilation. Mashup widgets 104 can encapsulate disparate data, user interface markup, and user interface behavior into a single component that generates code fragments, such as Dynamic HTML (DHTML) fragments, JavaScript® fragments, etc. These code fragments are executable portions of a mashup page that pull data from a content source and that use an eventing mechanism to interact with other mashup-widget-created-fragments and mashup application elements. Widgets 104 may also be described as an element of a Graphical User Interface (GUI) that displays an information arrangement changeable by the user and allows the user to have interaction. The defining characteristic of widget 104 is to provide a single interaction point for the direct manipulation of a given kind of data.

Data stores 105 and 108 can be physically implemented within any type of hardware including, but not limited to, a magnetic disk, an optical disk, a semiconductor memory, a digitally encoded plastic memory, a holographic memory, or any other recording medium. Data stores 105 and 108 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Figure 2:
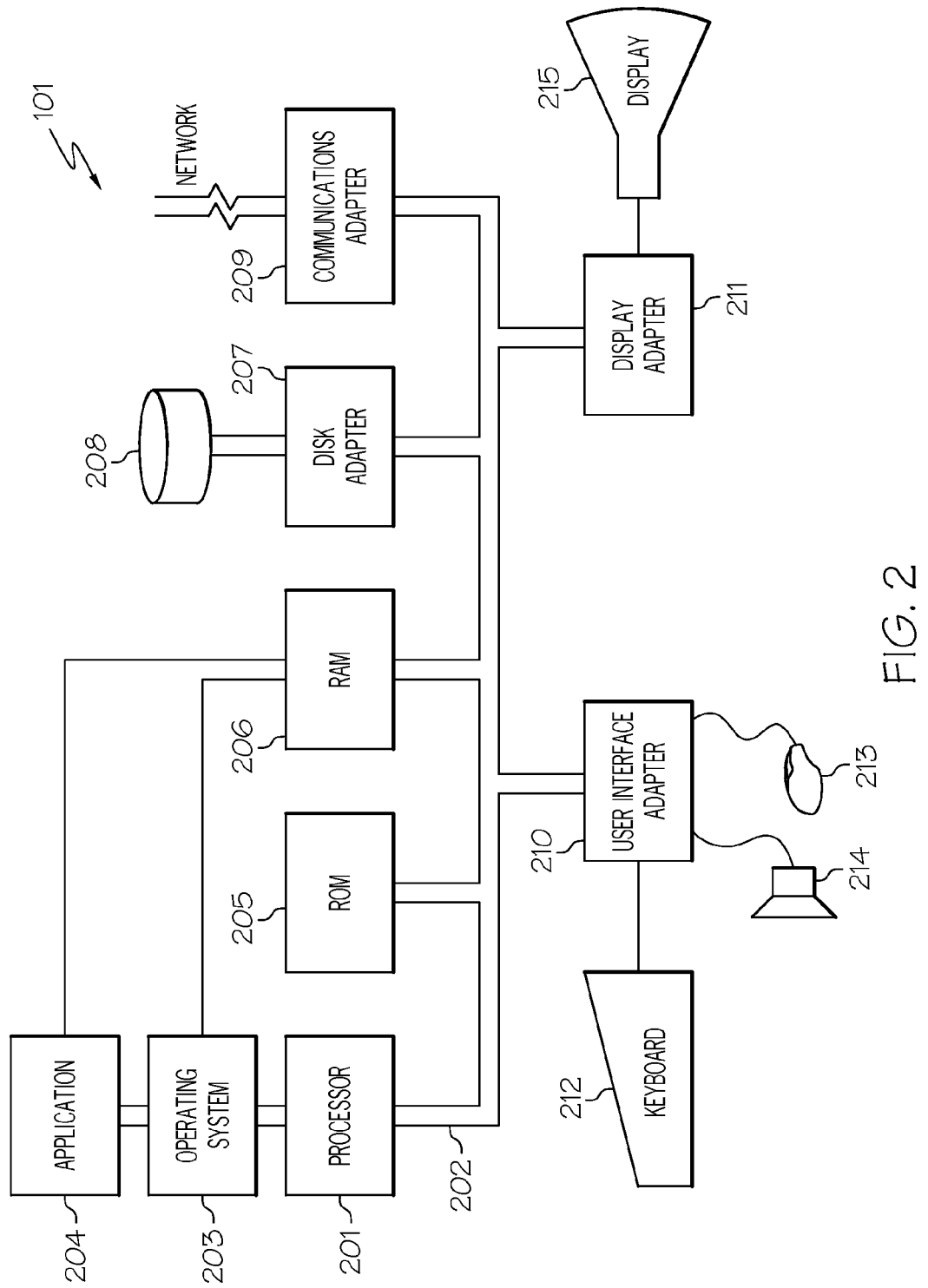
FIG. 2 illustrates a hardware configuration of a client device configured in accordance with an embodiment of the present invention.

Referring now to FIG. 2, FIG. 2 illustrates a hardware configuration of client device 101 which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a browser, a calendar application.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (network 103) thereby enabling client device 101 to communicate with mashup server 102.

I/O devices may also be connected to client device 101 via a user interface adapter 210 and a display adapter 211. Keyboard 212, mouse 213 and speaker 214 may all be interconnected to bus 202 through user interface adapter 210. Data may be inputted to client device 101 through any of these devices. A display monitor 215 may be connected to system bus 202 by display adapter 211. In this manner, a user is capable of inputting to client device 101 through keyboard 212 or mouse 213 and receiving output from client device 101 via display 215 or speaker 214.

Figure 3:
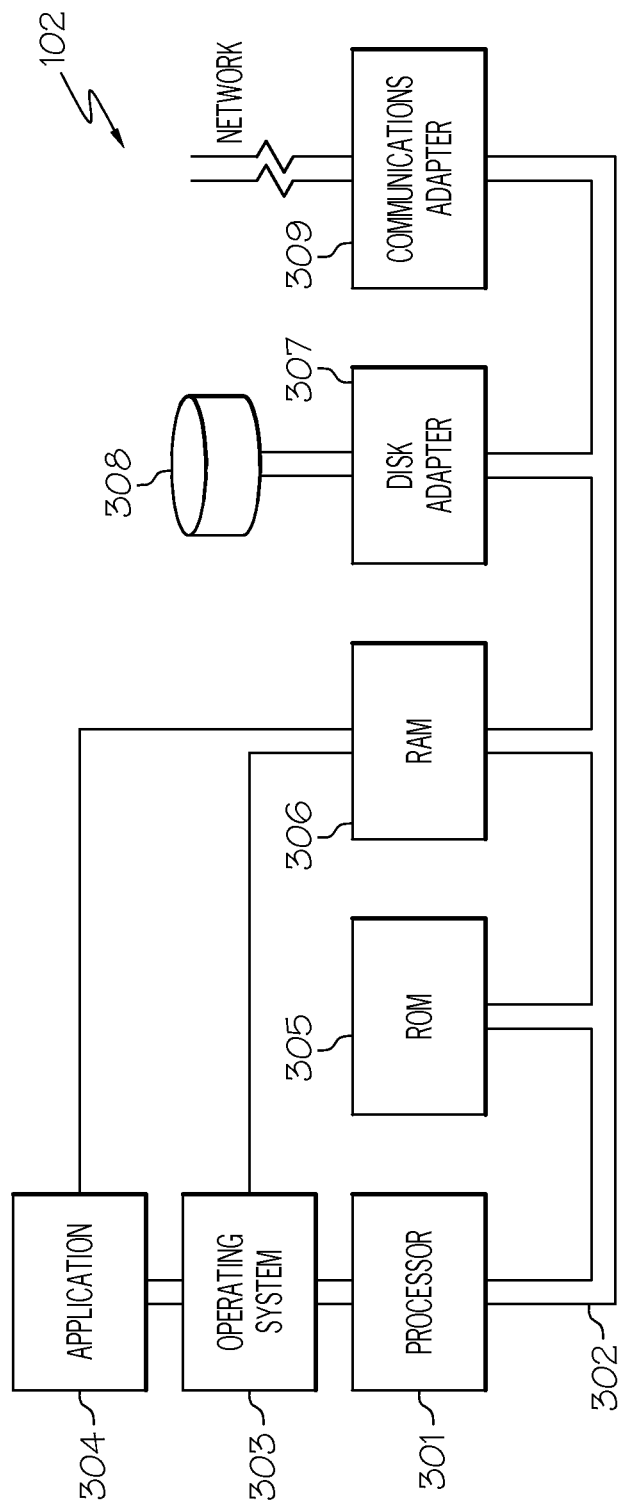
FIG. 3 illustrates a hardware configuration of a mashup server configured in accordance with an embodiment of the present invention.

As stated above, FIG. 3 illustrates a hardware configuration of a mashup server 102 (FIG. 1) which is representative of a hardware environment for practicing the present invention. Referring to FIG. 3, mashup server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, widget engine 109, a program for integrating a calendaring system with a mashup page containing widgets to provide information regarding the calendared event, both before, during and after the calendared event, as discussed further below in association with FIG. 4.

Referring again to FIG. 3, read-only memory ("ROM") 305 is coupled to system bus 302 and includes a basic input/output system ("BIOS") that controls certain basic functions of mashup server 102. Random access memory ("RAM") 306 and disk adapter 307 are also coupled to system bus 302. It should be noted that software components including operating system 303 and application 304 may be loaded into RAM 306, which may be mashup server's 102 main memory for execution. Disk adapter 307 may be an integrated drive electronics ("IDE") adapter that communicates with a disk unit 308, e.g., disk drive. It is noted that the program for integrating a calendaring system with a mashup page containing widgets to provide information regarding the calendared event, both before, during and after the calendared event, as discussed further below in association with FIG. 4, may reside in disk unit 308 or in application 304.

Mashup server 102 may further include a communications adapter 309 coupled to bus 302. Communications adapter 309 interconnects bus 302 with an outside network (network 103) thereby allowing mashup server 102 to communicate with client device 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, in order for participants of a calendared event to access resources (e.g., file folder holding presentation materials) regarding the calendared event, the participants may have to link to a myriad of disjoint applications thereby causing the participants to have a fractured experience. Additionally, in many cases, these resources may be changed between the time of the original invitation and the event thereby leaving uniformed participants in limbo. Also, some of these resources may be not be appropriate for some of the participants of the event to see.

Figure 4A:
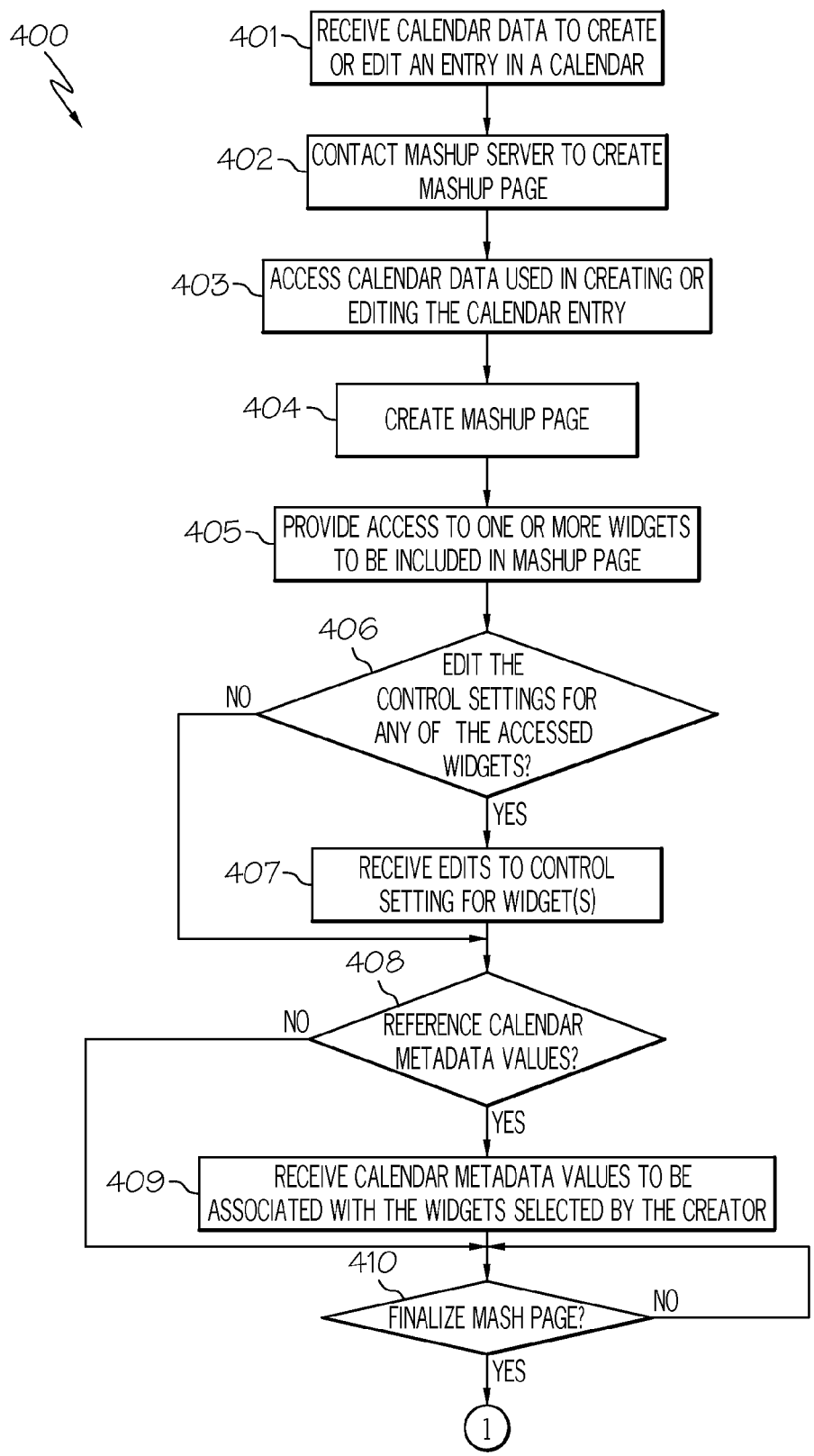
FIGS. 4A-4B are a flowchart of a method for integrating a calendaring system with a mashup page containing widgets to provide information regarding the calendared event in accordance with an embodiment of the present invention.
Figure 4B:
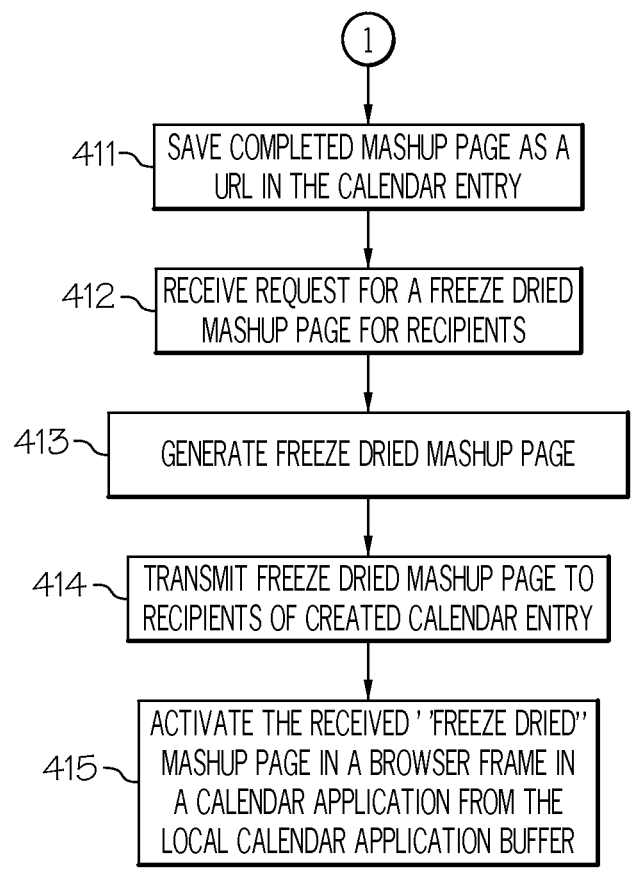

The principles of the present invention provide a means for allowing the creator of a calendar event to provide the participants of a calendared event access to various resources without requiring the participants to link to a myriad of disjoint applications as discussed below in connection with FIGS. 4A-4B. Furthermore, the principles of the present invention allow the event creator to easily provide access to particular resources to particular participants as discussed below in connection with FIGS. 4A-4B. Additionally, the principles of the present invention ensure that the participants have access to the latest modifications to these external resources as discussed below in connection with FIGS. 4A-4B. FIGS. 4A-4B are a flowchart of a method for integrating a calendaring system with a mashup page containing widgets to provide information regarding the calendared event, both before, during and after the calendared event.

As stated above, FIGS. 4A-4B are a flowchart of a method 400 for integrating a calendaring system with a mashup page containing widgets to provide information regarding the calendared event, both before, during and after the calendared event in accordance with an embodiment of the present invention.

Referring to FIG. 4A, in conjunction with FIGS. 1-3, in step 401, a calendar application on client device 101 receives calendar data (e.g., date of calendar event, time of calendar event, location of calendar event, list of recipients) to create or edit an entry in the calendar application by the user of the calendar application (referred to herein as the "creator").

In step 402, the calendar application on client device 101 contacts mashup server 102 to create a mashup page while providing a call back entry point that points to the metadata corresponding to the calendar data received in step 401.

In step 403, mashup server 102, using the call back entry point, accesses the calendar data (inputted in step 401) used in creating or editing the calendar entry.

In step 404, mashup server 102 creates the mashup page. In step 405, mashup server 102 provides access to the creator of one or more widgets 104 to be included in the mashup page, where widgets 104 use the accessed calendar data. There are a variety of widgets 104 that may be included in the mashup page that provide information to the recipients of the calendared event, such as information about the meeting, about their fellow invitees, about past meetings, etc. Examples of widgets 104 include, but not limited to, user profiles, social connections, related meetings, meeting notes and meeting documents.

A "user profiles" widget provides extensive information (more than what may be gleaned from a person's e-mail address) about the invitees of the meeting inside the meeting invitation. A user would easily be able to see a compiled list of significant people along with useful information about them (preferred name, photo, company, job responsibility, report chain, current projects, etc.). When the creator adds the "user profiles" widget to the frame of the mashup page, the creator can configure where information on users is pulled from—including user repositories, such as a Lightweight Directory Access Protocol (LDAP) or blue pages, social networking sites, such as LinkedIn® or Facebook®, or entries from the local address book. The creator may also add notes about invitees that will be visible by the invitation recipients.

Cross widget configuration could be used to personalize the event. For example, wiring the recipient's business card and meeting metadata to a hotel reservation widget may allow the hotel reservation widget to show properties near the meeting location that offered discounts to the recipient's organization.

In another example, rather than simply showing a list of meeting participants, a "social connections" widget displays how meeting invitees are related to one another. Based on the invitees' profile information (e.g., company, job responsibility, report chain, current projects) as well as past meeting information, a user can determine whether invitees are internal or external employees, their group membership/leadership status, or if they have previously worked together. An individual recipient would be able to see their relationship to, and how they fit within the group of invitees.

Occasionally, a user may be unaware of a scheduled meeting that they have not been invited to, but wish to attend. A "related meetings" widget shows a user past and future meetings that are associated with the current meeting invitation. The widget can display not only other iterations of the same meeting on different dates, but can also show meetings with similar metadata (such as topic, meeting creator, meeting invitees). The user may see an entry they are interested in and request more information on the related meeting.

Often users take notes about a meeting offline, requiring that the user send the notes to the other parties involved in the meeting, as well as archive the notes themselves for reference in future meetings. A "meeting notes" widget can provide both a record of notes from previous related meetings as well as a dynamic shared place in the meeting invitation for invitees to take notes before, during, and after the meeting. Live sharing of note taking may prevent the need to send out the notes after the meeting as well as improve the quality of the notes due to instant collaboration. By applying access control, collaboration might be limited to a subset of recipients, such as the presenters.

Similar to the "meeting notes" widget, the "meeting documents" widget provides a dynamic place to store and share documents pertaining to the meeting. Users may upload their documents at any point before, during, or after a meeting. Documents from previous meetings may be brought along for reference in future meetings. By applying access control, updates and visibility can be set for subsets of the recipients.

Referring again to FIG. 4A, in conjunction with FIGS. 1-3, in step 406, a determination is made by mashup server 102 as to whether the user of the calendar application edits the control settings for any of widgets 104 used by the creator in the created mashup page. If the user of the calendar application edits the control settings for any of widgets 104 used by the creator in the created mashup page, then, in step 407, mashup server 102 receives the edits to the control settings to the selected widgets 104, such as tailoring the visibility of widgets 104 to selected participants. For example, the creator of the mashup page may make an activity widget visible only to the recipients who are the presenters.

If there are no edits to the control settings for any of widgets 104, or upon receiving edits to the control settings to the selected widgets 104, then, in step 408, a determination is made by mashup server 102 as to whether any of widgets 104 used by the creator in the created mashup page are to reference any of the calendar metadata values (e.g., date of calendar event, time of calendar event, location of calendar event, list of recipients). For example, location information may be referenced by a map widget thereby allowing the map widget to identify the meeting location without requiring the user to type the location information.

If any of widgets 104 are to reference any of the calendar metadata values, then, in step 409, mashup server 102 receives the particular calendar metadata values from the calendar application (determined by the creator of the calendar entry) that are to be associated with the widgets 104 selected by the creator.

If widgets 104 are not to reference any of the calendar metadata values, or upon receiving the calendar metadata values to be referenced by the selected widgets 104, then, in step 410, a determination is made by mashup server 102 as to whether the mashup page is finalized by the creator (i.e., completed and ready to be published).

If the mashup page is not to be finalized, then mashup server 102 continues to determine if the mashup page is finalized in step 410.

Referring to FIG. 4B, in conjunction with FIGS. 1-3, if, however, the mashup page is finalized, then, in step 411, mashup server 102 saves the completed mashup page as a Uniform Resource Locator (URL) in the created/edited calendar entry. In one embodiment, session cookie information is encoded in this URL by way of a sever side cookie jar (not shown in FIG. 1) to eliminate the need for a calendar client cookie cache. The server side cookie jar refers to storage in mashup server 102 used to hold session cookies. In this manner, a "freeze dried" web page (discussed further below) retains the needed session state information, including the recipient identity, without the need to access Hypertext Transfer Protocol/HTTP Secure (HTTP/HTTPS) header information, which is not available when viewing the local buffer copy of the mashup page. A "freeze dried" web page refers to a web page, such as the mashup page, that is static in nature. An example of a "freeze dried" mashup page is illustrated in FIG. 5.

Figure 5:
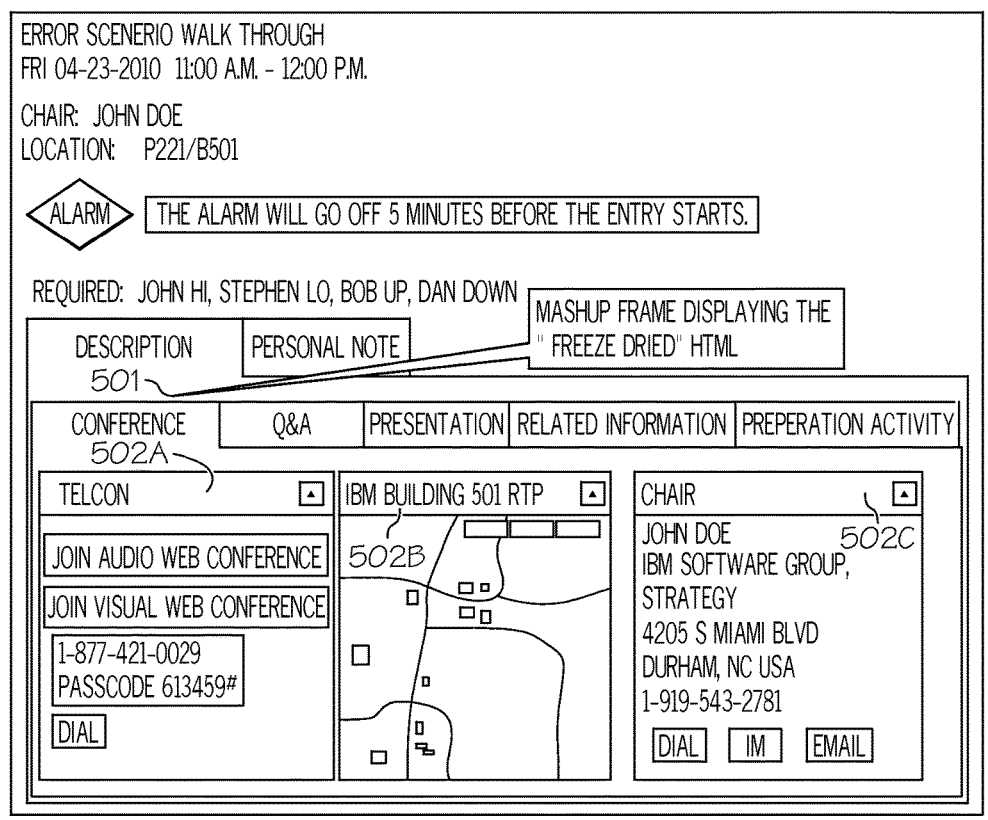
FIG. 5 illustrates a freeze dried mashup page in accordance with an embodiment of the present invention.

Referring to FIG. 5, FIG. 5 illustrates a "freeze dried" mashup page 500 in accordance with an embodiment of the present invention. "Freeze dried" mashup page 500 includes a frame 501 along with widgets 502A-502C under the panel identified as "Conference." Frame 501 also includes panels directed to "Q&A," "Presentation," "Related Information," and "Preparation Activity."

In one embodiment, since session cookie information is encoded in the URL as discussed above, offline viewing of mashup page 500 is possible. In one embodiment, mashup server 102 (FIGS. 1 and 3) imbeds JavaScript® components within the HyperText Markup Language (HTML) markup of the rendered mashup page (discussed below) so that they do not need to be dynamically loaded when viewing the mashup page from the local buffer of client device 101.

In one embodiment, mashup page 500 will retain its interactive nature until an action requires remote access. By extending the JavaScript® proxy code within mashup page 500, a visual indication of this condition can be communicated to the viewer. For example, a hint may be displayed that one needs to be on-line when the user clicks the next-page icon in a feed reader widget.

Referring again to FIG. 4B, in conjunction with FIGS. 1-3, in step 412, mashup server 102 receives a request from the creator via the calendar application for a "freeze dried" mashup page for the recipients to the calendar event.

In step 413, mashup server 102 generates the "freeze dried" mashup page. In step 414, mashup server 102 transmits the "freeze dried" mashup page, along with the created/edited calendar entry, to the recipients of the calendar entry. For example, mashup server 102 sends a meeting notice or meeting update to the recipients of the calendar entry containing the "freeze dried" mashup page. In one embodiment, the "freeze dried" mashup page corresponds to the event descriptions which are transmitted in the iCalendar format or can be represented as a file in the xCal format. iCalendar is a computer file format which allows Internet users to send meeting requests and tasks to other Internet users, via e-mail, or sharing files with an extension of .ics. Recipients of the iCalendar data file can respond to the request easily or counter propose another meeting data/time. Recently, an XML-compliant representation of the iCalendar standard, xCal, has started to be adopted by calendaring systems.

In step 415, the recipient activates the received "freeze dried" mashup page, along with the created/edited calendar entry, in a browser frame in a calendar application from the local calendar application buffer, even if the respective client device 101 is offline when the calendar entry is viewed.

By having the mashup page utilize widgets 104 which provide the information that normally would be accessible by the participants via links to a myriad of disjoint applications, the participant can now obtain the information immediately without accessing external applications. Furthermore, widgets 104 in the mashup page can be tailored by the creator to be rendered for selected participants thereby ensuring that only particular participants access the information desired by the creator. Additionally, since the mashup page includes widgets 104 that bring interactive live data, the participants will have access to the latest resource information.

Other benefits of the principles of the present invention discussed herein include only requiring the event creator's calendar system to be mashup augmented since most calendar systems are able to render HTML. Furthermore, a vast array of existing mashup widgets becomes immediately available to the calendar event author thereby foregoing the need to create calendar specific plug-ins.

In some implementations, method 400 may include other and/or additional steps that, for clarity, are not depicted. Further, in some implementations, method 400 may be executed in a different order presented and that the order presented in the discussion of FIGS. 4A-4B is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for integrating a calendaring system with a mashup page, the method comprising:
   accessing calendar data used in creating or editing an entry in a calendar;
   creating said mashup page;
   providing a plurality of different widgets on said mashup page, wherein each of said plurality of widgets use said accessed calendar data to provide different information to a recipient of said calendar entry;

saving said mashup page associated with said calendar entry; and transmitting, by a processor of a mashup server, said mashup page along with said calendar entry to one or more recipients of said calendar entry.

2. The method as recited in claim 1, wherein said mashup page is a freeze dried mashup page.

3. The method as recited in claim 1, wherein said mashup page is saved as a Uniform Resource Locator (URL).

4. The method as recited in claim 3, wherein session cookie information is encoded in said URL.

5. The method as recited in claim 1, wherein said mashup page is transmitted to said one or more recipients of said calendar entry in one of an iCalendar format and an xCal format.

6. The method as recited in claim 1 further comprising:
editing control settings for one of said plurality of widgets on said mashup page so that said one of said plurality of widgets is tailored to be visible to selected recipients of said one or more recipients of said calendar entry.

7. The method as recited claim 1 further comprising:
receiving a calendar metadata value from a calendar application; and
associating one or more of said plurality of widgets with said received calendar metadata value.

8. The method as recited in claim 1 further comprising:
activating said mashup page in a calendar application from a local calendar application buffer by a client device in response to said client device being offline.

9. A computer program product embodied in a computer readable storage medium for integrating a calendaring system with a mashup page, the computer program product comprising the programming instructions for:
accessing calendar data used in creating or editing an entry in a calendar;
creating said mashup page;
providing a plurality of different widgets on said mashup page, wherein each of said plurality of widgets use said accessed calendar data to provide different information to a recipient of said calendar entry;
saving said mashup page associated with said calendar entry; and
transmitting said mashup page along with said calendar entry to one or more recipients of said calendar entry.

10. The computer program product as recited in claim 9, wherein said mashup page is a freeze dried mashup page.

11. The computer program product as recited in claim 9, wherein said mashup page is saved as a Uniform Resource Locator (URL).

12. The computer program product as recited in claim 11, wherein session cookie information is encoded in said URL.

13. The computer program product as recited in claim 9, wherein said mashup page is transmitted to said one or more recipients of said calendar entry in one of an iCalendar format and an xCal format.

14. The computer program product as recited in claim 9 further comprising the programming instructions for:
editing control settings for one of said plurality of widgets on said mashup page so that said one of said plurality of widgets is tailored to be visible to selected recipients of said one or more recipients of said calendar entry.

15. The computer program product as recited claim 9 further comprising the programming instructions for:
receiving a calendar metadata value from a calendar application; and
associating one or more of said plurality of widgets with said received calendar metadata value.

16. A system, comprising:
a memory unit for storing a computer program for integrating a calendaring system with a mashup page; and
a processor coupled to said memory unit, wherein said processor, responsive to said computer program, comprises:
circuitry for accessing calendar data used in creating or editing an entry in a calendar;
circuitry for creating said mashup page;
circuitry for providing a plurality of different widgets on said mashup page, wherein each of said plurality of widgets use said accessed calendar data to provide different information to a recipient of said calendar entry;
circuitry for saving said mashup page associated with said calendar entry; and
circuitry for transmitting said mashup page along with said calendar entry to one or more recipients of said calendar entry.

17. The system as recited in claim 16, wherein said mashup page is a freeze dried mashup page.

18. The system as recited in claim 16, wherein said mashup page is saved as a Uniform Resource Locator (URL).

19. The system as recited in claim 18, wherein session cookie information is encoded in said URL.

20. The system as recited in claim 16, wherein said mashup page is transmitted to said one or more recipients of said calendar entry in one of an iCalendar format and an xCal format.

21. The system as recited in claim 16, wherein said processor further comprises:
circuitry for editing control settings for one of said plurality of widgets on said mashup page so that said one of said plurality of widgets is tailored to be visible to selected recipients of said one or more recipients of said calendar entry.

22. The system as recited in claim 16, wherein said processor further comprises:
circuitry for receiving a calendar metadata value from a calendar application; and
circuitry for associating one or more of said plurality of widgets with said received calendar metadata value.

* * * * *